Patented Jan. 26, 1954

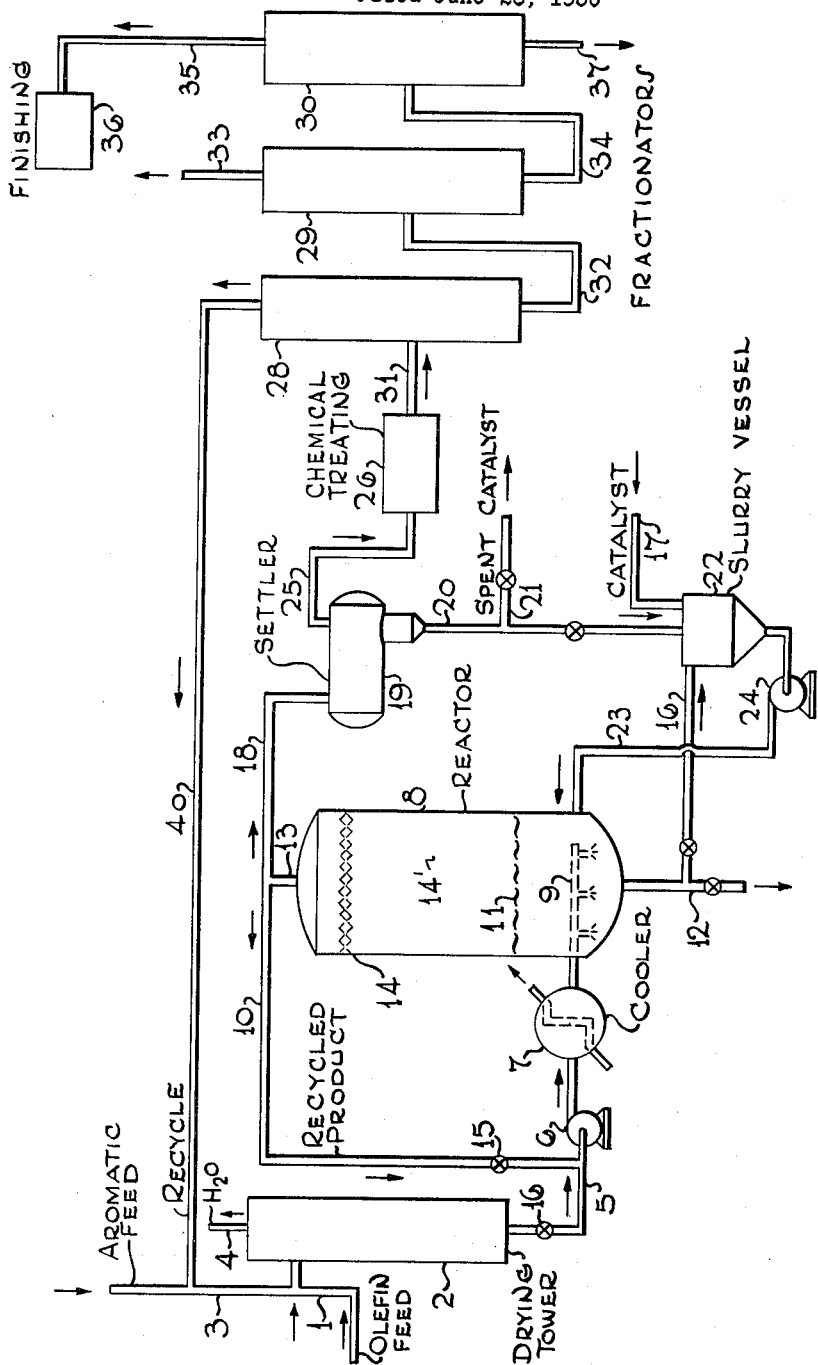

2,667,519

UNITED STATES PATENT OFFICE 2,667,519

ALKYLATION OF AROMATICS

Walter J. Paltz, Fanwood, and Bruce R. Tegge, Chatham, N. J., assignors to Standard Oil Development Company, a corporation of Delaware Application June 28, 1950, Serial No. 170,754

8 Claims. (Cl. 260—671)

This invention relates to improvements in the alkylation of aromatics by olefins with recycling of alkylation products through a heavier catalyst mixture. It is more particularly concerned with methods of reducing catalyst sludge handling problems and product recovery problems, which are accentuated in the manufacture of detergent alkylates by mono-alkylation of an aromatic compound with a $C_{11}$ to $C_{21}$ olefin, using a system for recycling adequate amounts of the alkylation product including unreacted aromatic for mixing the reactants in proper ratio with minimal removal of catalyst from the reaction zone.

In the olefin alkylation of aromatics, relatively large volumes of catalyst, e. g. as a sludge or emulsion, were fed to a reactor, either upflow or downflow, equipped with a mixing means, and the reaction mixture including the catalyst sludge or emulsion was withdrawn to a settler, from which the catalytic sludge or emulsion was returned to the reactor to be mixed with additional fresh feed of olefins and aromatic reactants in a required ratio, the aromatic to olefin reactant ratio in the feed being kept high enough to increase the desired amount of mono-alkylation and reduce undesired side reactions, such as polyalkylation, polymerization, cracking and isomerization. Thus, in the past with increased aromatic to olefin feed ratios there have been increased difficulties in handling larger quantities of unreacted aromatic compounds, increased catalyst separation, handling, and recirculating difficulties, increased size of equipment, etc.

In accordance with the present invention, the described difficulties are largely minimized or eliminated without detriment to the control of the selective alkylation reaction for obtaining mono-alkylation, even though the aromatic to olefin feed supply ratio is maintained at a relatively low level, by employing a procedure of recycling a large portion of the alkylation products including the unreacted aromatic compound with the alkylate but substantially free of catalyst. With this procedure, the content of unreacted aromatic is maintained at a relatively low level in the withdrawn product, from which the net amount of alkylate formed per pass has to be recovered by chemical treatments and fractionation. Thus, the separation of unreacted aromatic from alkylate product for return to the reactor is also greatly simplified while the yield rate is undiminished.

There are various aromatic and olefinic reactants which may be used in the alkylation reactions with the various inorganic halide alkylation catalysts, such as $BF_3$, anhydrous liquid HF, mixtures of $BF_3$ with HF, and with promoters such as water or oxy-organic compounds, and $AlCl_3$, more particularly certain complexes of $AlCl_3$ which are only slightly miscible with the hydrocarbons. The olefinic reactants include monomers and polymers of olefins. The aromatic reactants include benzene, alkyl benzenes, naphthalenes, phenols, and their homologs.

The utility and advantages of the present invention are best exemplified by the alkylation of aromatic hydrocarbons, such as benzene and toluene with $C_{11}$ to $C_{21}$ olefins using an inorganic halide catalyst, such as aluminum chloride in a complex, to obtain selective monoalkylation of high selectivity required in the manufacture of detergent alkylates with a low cost catalyst and a minimum of corrosive action. The olefins may be obtained by cracking or dehydrogenating high boiling paraffins, by dimerizing, polymerizing, or copolymerizing lower olefins, e. g. propene, butenes, hexenes, etc.

The method will be described with reference to a flow plan in the accompanying drawing for a jet type reactor system, although it applies with suitable modifications to other reactor systems, such as use a turbomixer or other mechanical mixing means in a bottom part of the reaction zone, if desired.

Referring to the drawing, a fresh feed of the aromatic and olefin reactants from feed line 1 are preconditioned for the reaction, preferably by being supplied to a drying unit, such as the azeotropic drying tower 2, in which an aromatic hydrocarbon such as part of the aromatic reactant may act as an entrainer for removing water commonly present in the feed materials. In the same drying unit fresh feed and recycled aromatic reactant, from line 3 may be treated at the same time, but the aromatic to olefin ratio is regulated in the mixtures treated. The drying unit may be replaced or supplemented by various other drying means, such as, alumina driers, calcium chloride driers, etc.

The dried reactant feed mixture withdrawn from the bottom of drying tower 2 by line 5 is fed by pump 6 through a heat exchange cooling means 7 into a bottom part of reactor 8 through a bank of jets 9. The bank of jets 9 are preferably downwardly directed to obtain the best reaction. With this fresh feed can be returned a required proportion of recycled alkylation product being recycled from line 10, as will be explained, to supply the required high proportion of aromatic reactant to olefin reactant where the reactants enter the reaction zone for contact with the catalyst.

The catalyst sludge or emulsion is maintained in the reactor 8 in a suitable volume at a bottom part of the reactor, up to a predetermined level 11, which is adjustable. The catalyst sludge or emulsion is relatively heavier than the alkylate product and heavier than the unreacted aromatic which pass upwardly from this body of catalyst sludge or emulsion to stratify an upper hydrocarbon oil phase layer above the level 11. The volume of the catalyst sludge or reaction mixture maintained in the reactor can be regulated by withdrawing sludge from the reactor itself through a withdrawal line 12 at the bottom of the reactor or some other part of the reactor below level 11. The quantity of sludge or reaction mixture contained in the reactor can be determined by some type of specific gravity indicating device, which can be also employed for automatic control of the catalyst level.

As the catalyst and the reactants become agitated for intimate contact in the catalyst-reaction mixture, the hydrocarbon product passes upwardly from the bottom of the reactor through the heavier reaction mixture phase which tends to settle, with the result that the catalyst or sludge decreases with height reached in the reactor; and the alkylation product collects in a relatively quiescent zone 14. With a given size circulation pump, e. g. pump 6, the liquid flow through the jets 9 can be varied to increase or decrease the effective sludge inventory in the reactor and settling space 14' above the upper level 11. A high recycle rate of the product from line 10 valuably aids the jet mixing.

The inflow of recycled alkylation product from line 10 to feed line 5 can be regulated by setting valves 15 and 16 in each of these lines leading to the intake of the circulating pump 6. Thus, with a given reactor system, it is possible to vary widely the catalyst contact time as well as the ratio of aromatic to olefin within the catalytic reaction zone of the reactor, this ratio, being herein termed internal aromatic to olefin ratio, which depends on the amount of the aromatic reactant being recycled in the product from line 10 and the aromatic reactant entering from line 5 with the olefin reactant. It is important to be able to control this internal ratio by having a larger volume of aromatic reactant in the recycled alkylation product from line 10 than in reactant feed from line 5 sent into the reaction zone continuously.

From a suitable point located above the catalyst level 11, the settled liquid alkylation product as free of catalyst as practicable is withdrawn from an upper part of the reactor vessel 8 through line 13. This withdrawn alkylation product comprising principally the alkylate and unreacted aromatic may contain a small amount of entrained catalyst, sludge, and substances, such as water and hydrogen halide. Various means, such as a screen, knockout baffles, or filtering means indicated in the upper part of the reactor 8 by 14 may be used to aid in diminishing the amount of entrained catalyst sludge carried out of the reactor through the top withdrawal line 13. With such modifications for aiding settling out of the sludge or catalyst from the alkylation product, even mechanical mixing devices, such as a turbomixer, may be used in the bottom of the reactor to agitate the heavier reaction mixture containing the catalyst, but it is advantageous to eliminate mechanical mixing devices of this type.

The alkylation product withdrawn through line 13 is divided into two streams, in general the main stream thereof being returned through recycle line 10 to pump 6 for establishing the desired internal aromatic to olefin ratio and for securing adequate mixing. The other stream of the product is passed through line 18 into a settler 19 for accomplishing removal of any entrained small amount of catalyst sludge, which can be withdrawn through a bottom drawoff by line 20 to be discarded through line 21 as spent or be returned in part with make-up catalyst from a slurry tank 22 by pump 24 in line 23.

Make-up catalyst may be added to slurry tank 22 through line 17 or by any convenient feed means. Make-up catalyst may be added, also, to catalyst sludge in slurry tank 22 by withdrawing catalyst sludge directly from the reactor 8 through line 16. For the best results in the present process, the aluminum chloride is combined with the spent aluminum chloride complex, that thus becomes activated, so that little, if any, free aluminum chloride is introduced into the reactor. The activated sludge will contain at saturation from 35 to 45 weight per cent combined aluminum chloride, and the spent sludge contains less combined aluminum chloride.

The clarified alkylation product from settler 19 is passed through line 25 into a treating unit 26, which in general may include means for neutralizing or removing residual traces of acidic substances, such as, any traces of catalyst, or acidic substances, such as hydrogen chloride, etc. Washing with caustic is usually followed by a water washing so that the hydrocarbon material is then suitably conditioned for fractional distillation which is then carried out in one or a series of fractionating towers, e. g. towers 28, 29 and 30. With the treated alkylation product entering tower 28 from line 31 the relatively volatile substance, that is the unreacted aromatic, is taken overhead to be returned through line 40. The bottoms of tower 28 are passed by line 32 into the next fractionation zone tower 29 for stripping out light alkylate product removed overhead by line 33, bottoms from tower 29 are passed by line 34 into the next fractionating zone of tower 30 from which a desired intermediate alkylate product is taken overhead through line 35 to a finishing unit 36. The heavy alkylate fraction is withdrawn as bottoms by line 37 from tower 30.

To illustrate the method with the flow plan system described, if the reactor circulating pump 6 works at a capacity that is 5 times the volume of the reactant feed from line 5, it can force into the reactor 1 volume of this reactant feed mixture with approximately 4 volumes of the recycled alkylation product (alkylate and unreacted aromatic withdrawn from the upper part of the reactor 8). If the aromatic to olefin volume ratio of the feed from line 5 is 2:1 and if the unreacted aromatic is about 55 volume per cent of the recirculated product, then the recirculated alkylation product entering the reactor with this feed will supply sufficient additional aromatic to make the internal aromatic to olefin volume ratio about 10:1 which affords a better ratio of aromatic to the olefin supplied to the reaction zone. On the other hand, if the aromatic to olefin volume ratio from feed line 5 is 2:1 and no substantial amount of hydrocarbon product is recycled, the resulting internal volume ratio of aromatic to olefin in the reaction zone is substantially less than 5:1 and gives an unsatisfactory product unless a large amount of sludge is recycled. Therefore, it can be seen that these ratios of aromatic to olefin can be maintained at a high level, considerably higher than those which are practicable in any system that employs a once-through hydrocarbon flow with recycling of catalyst sludge to afford a more flexible control in obtaining a desired alkylate product and yield.

To further illustrate the advantages of the method of the present invention with regard to reducing difficulties in recovering the products, it is first to be noted that by using a high recycle of alkylation product with an adjusted aromatic to olefin ratio in the initial feed from line 5, the effluent alkylation product from the reactor 8 withdrawn through line 13 can be kept at a low aromatic to alkylate ratio. For example, if the feed from line 5 supplies the stoichiometrical proportion of one mole of aromatic per mole of olefin for mono-alkylation and the recycled hydrocarbon product from line 10 increases the proportion of aromatic to a much higher proportion with respect to the olefin reactant, then the effluent hydocarbon product at close to 100% reaction will contain a relatively low proportion of unreacted aromatic per mole of net alkylate produced per pass. Thus, the present method makes it possible to keep the ratio of aromatic to alkylate in the effluent hydrocarbon product stream extremely low while maintaining the desired high internal aromatic:olefin ratio. As a consequence of this, much less unreacted aromatic is handled in the subsequent recovery of the alkylate, including chemical treatments, fractional distillation of the unreacted aromatic from the alkylate, and preconditioning of the thus recovered unreacted aromatic for return with the fresh feed. This reduction in recovery of the aromatic makes a considerable saving in equipment as well as chemicals used in the treatments.

To further demonstrate the feasibility and advantages of the operation using the procedure of recycling the hydrocarbon product, experimental plant studies were made. The following table presents typical comparative data and results obtained in this study.

TABLE

*Effect of recycling hydrocarbon product vs recycling sludge*

[Operating conditions: Reacting benzene and $C_{12}$ propylene polymer. Temperature 40° F.–50°F. $AlCl_3$ catalyst promoted by HCl.]

|  | Sludge Recycle | Hydrocarbon Product Recycle |
|---|---|---|
| Inside diameter of jet, mm | 3 | 3 |
| Pressure drop across jet, p. s. i | 18.0 | 1.5 |
| Recycled rate, L./Hr | 360 | 105 |
| Sludge/Hydrocarbon ratio in recycle | 0.67 | 0.08 |
| Mixing energy, HP-Hr./Gal. olefin | 0.095 | 0.002 |
| Composite of total alkylate, Volume percent: |  |  |
|   Degradation product | 14 | 14 |
|   Detergent alkylate | 72 | 71 |
|   Polymer and heavy alkylate | 14 | 15 |
| Yields based on olefin feed, Volume percent: |  |  |
|   Total alkylate | 126 | 128 |
|   Detergent alkylate | 91 | 91 |
|   Sludge product | 13 | 10 |

The above data is representative of a number of comparative tests, including tests in which the internal volume ratio of aromatics:olefin was varied in the range of 3:1 to 300:1.

It is of interest to note that the recycling of the alkylation product, which includes the unreacted aromatic benzene, with the alkylate does not have any detrimental effect with respect to the reaction selectivity for producing the desired detergent alkylate ($C_6H_5 \cdot C_{12}H_{25}$), although it might have been assumed that by recycling the alkylate there would be a tendency toward polyalkylation. The selectivity was substantially the same with both methods of operation, but a somewhat higher yield was obtained with the hydrocarbon product recycling method. Moreover, the alkylation product recycling method definitely showed an advantage in greatly reducing the energy requirement of the recycling pump, e. g. almost a 50 fold reduction per gallon of olefin reactant in horse-power hours on account of the much greater difficulty in pumping the heavy sludge. At the same time there was the advantage of a much lower catalyst inventory required in the hydrocarbon product recycling operation, making a saving in the relatively expensive catalyst phase. It was found that the recycling of the hydrocarbon product through the jets achieved adequate mixing. By recycling the alkylation product instead of the sludge, a number of other difficulties are minimized, such as, erosion which is caused by high sludge velocities, pipe stoppages likely to occur when sludge is being recycled, and corrosion difficulties in pumps, etc.

The foregoing described tests were carried out under conditions which were favorable for the sludge recycling operation in order to obtain a direct comparison with regard to the sludge handling problem. However, the operation with hydrocarbon product recycling is still more outstanding in its advantages when compared on the basis of its minimum requirements of aromatic to olefin in the initial supply feed, because the sludge recycling operation essentially requires a much higher ratio of benzene-olefin in the fresh feed for optimum results, for example, a volume ratio of 5:1, whereas the hydrocarbon product recycling operation lowers this ratio requirement in the fresh feed to the order of 1:1 to 3:1 and thereby lowers the content of aromatic in the alkylation product stream which is sent to the recovery units.

The economical advantages of recycling the alkylation product in suitable proportion to maintain the required excess of aromatic reactant in the reaction zone is illustrated by the following simplified example:

Considering that the minimum aromatic to olefin mole ratio required in the reaction zone is 10:1, the once-through method with recycling of catalyst sludge requires nearly this same ratio be maintained in the feed, and the product would have an approximate composition of: 9 moles unreacted aromatic/1 mole of alkylate. In contrast thereto, by recycling 10.5 moles of product, having the composition: 2 moles aromatic/1 mole alkylate with each mole of olefin in fresh feed containing: 3 moles aromatic/1 mole olefin. With the required internal mole ratio of 10:1 thus maintained, the product contains only 2 moles unreacted aromatic/1 mole alkylate. Thus, about two-thirds of the total quantity of this product can be recycled to maintain the required internal aromatic/olefin ratio while the other third is processed, e. g. by chemical treatment and distillation to separate only 2 moles of unreacted aromatic from each 1 mole of alkylate; whereas, with the method of sludge recycling, over four times the amount of unreacted aromatic has to be processed to separate 9 moles of unreacted aromatic from each 1 mole of alkylate. Similarly, the hydrocarbon product recycling method greatly reduces the load on the drying units used for drying the fresh feed reactants.

The alkylation reaction is almost instantaneous, therefore, nearly all the olefin mixed with sufficient aromatic reactant is reacted upon intimate contacting with the catalyst retained in the reaction zone and intimate mixing or contacting is obtained by jetting the mixed reactants into the heavy catalyst-containing mixture. It is at the zone of mixing that the aromatic/olefin ratio is a more controlling factor on selectivity; and with the alkylation product recycling method desired high internal ratios of 3 to 300 volumes aromatic/1 volume of olefin can be maintained with the volume of catalyst mixture/hydrocarbon independently regulated, e. g., in the range of 0.1 to 10, the optimum selectivity being obtained at the lower catalyst hydrocarbon ratios between 0.1 and 2.0. Only a small fraction of the catalyst becomes removed from the reaction zone, by entrainment and for replacement by fresh catalyst.

In the alkylation reactions employing a catalyst sludge or emulsion retained in the reaction zone, a minor portion of this catalyst is withdrawn as spent catalyst to be replaced by freshly activated catalyst or catalytic material which maintains the needed catalyst strength. A portion of the spent catalyst to be separated may be catalyst sludge carried by the alkylation product effluent from the reactor into a separate settler, or periodically sludge may be removed from a bottom part of the reactor.

A fresh inorganic halide active catalyst, such as the aluminum chloride complex, is preferably brought into the reaction zone by addition of aluminum chloride to some of the sludge, with which it combines to form a complex of higher specific gravity than the alkylation product passed upwardly through the reaction zone so that the active catalyst will be retained in the reaction zone. The complex of aluminum chloride is nearly insoluble in the hydrocarbon phase. If the feeds are too dry it is desirable to add a small amount of moisture or HCl, about 2 to 4 weight per cent on $AlCl_3$ to act as a promoter.

What is termed catalyst sludge or emulsion generally includes some of the free catalytic material, such as $AlCl_3$, and the catalytic material combined or associated with the reactants or polymers of the olefin. In using other inorganic halide catalysts such as $BF_3$, HF, etc., such catalysts similarly are used in a form of a heavy liquid emulsion or sludge, that settles out of the reaction mixture to be retained at the bottom of the reaction vessel and similar reaction conditions are used.

As already indicated, it has been found best for the purpose of the present method to add the fresh aluminum chloride to a small portion of the spent catalyst mixture rather than to the reactants for replenishing the active catalyst in the reaction zone, because addition of the catalyst to the reactants tends to solubilize the catalyst therein and thus acts unfavorably against retention of a catalyst sludge within the reaction zone.

The alkylation reaction conditions of ordinary ranges of temperatures and pressures can be used, e. g. temperatures of about 30° F. to 115° F. or higher, atmospheric or superatmospheric pressures. While the alkylation reactions are faster with increased temperatures the degradation reactions are also increased with temperature. The pressure in the reaction zone is preferably only so high as needed to maintain the reactants mainly in liquid phase. The reaction contact period is preferably as low as practical, for example, 1 to 30 minutes.

The procedure outlined for handling the feeds, products and catalyst are readily adapted to the alkylation reactions with various kinds of olefin reactants, aromatic reactants, and alkylation catalysts. Preferably the olefin reactants are straight chain or slightly branched chain olefins from 11 to 21 carbon atoms per molecule which mainly give mono-alkylation of the aromatic reactant using any of the known catalysts which form heavier complexes that remain undissolved in the liquid alkylation product. The process, however, can be adapted for alkylations with lower olefin reactants that tend to give substantial amounts of polyalkylation, because the polyalkylation is reduced by increasing the aromatic:olefin ratio in the reaction zone, and the polyalkylate product after being separated from the mono-alkylate can be returned to the reaction zone.

What is claimed is:

1. In a process for alkylating an alkylatable aromatic compound of the class consisting of benzene and toluene with a $C_{11}$ to $C_{21}$ olefin by contact with an inorganic halide alkylation catalyst under alkylation conditions, the improvement which comprises admixing the olefin reactant with at least a stoichiometrical equimolar proportion of aromatic reactant to form a feed mixture, and passing the resulting feed mixture together with the recycled stream of alkylate product and unreacted aromatic into a reaction zone wherein the alkylation catalyst is retained as a sludge in a heavy reaction mixture, said recycled alkylation product supplying an excess of the aromatic reactant, dispersing the thus introduced mixture of the reactants and alkylate into the heavy reaction mixture, stratifying a resulting alkylation product liquid phase comprising principally alkylate and unreacted aromatic above the heavy reaction mixture which retains the catalyst in a bottom part of said reaction zone, withdrawing the alkylation product thus stratified, separating alkylate from a minor portion of the thus withdrawn product, and returning a remaining major portion of the withdrawn product as said recycled stream.

2. In a process defined by claim 1, dispersing the mixture of reactants and recycled products in the form of a plurality of downwardly directed jets into the heavy reaction mixture to agitate the reaction mixture, and settling out catalyst from the hydrocarbon product collected in a relatively quiescent liquid body stratified above said heavy reaction mixture in which the catalyst is retained.

3. In a process as defined by claim 1, the recycled alkylation product being in larger volume than the feed mixture passed into the reaction zone.

4. In a process as defined by claim 1, the recycled alkylation product being passed into the reaction zone at a rate which is at least four times the volume of said feed mixture passing into the reaction zone per unit of time, and the alkylate is separated from a minor portion of the alkylation product.

5. A process for alkylating an alkylatable aromatic compound of the class consisting of benzene and toluene with a $C_{11}$ to $C_{21}$ olefin by contact with an inorganic halide alkylation catalyst under alkylation conditions, which comprises drying a reactant mixture of the olefin and aromatic to be reacted in a reaction zone, admixing the dried reactant mixture with an alkylation product containing alkylate being formed and unreacted aromatic withdrawn from the reaction zone, passing the resulting mixture into intimate contact with a heavier mixture of the catalyst maintained as a sludge in said reaction zone under alkylating conditions, separating a resulting alkylation product of alkylate and excess aromatic reactant from the catalyst, retaining said catalyst in the reaction, separately withdrawing a portion of the catalyst as it becomes spent from the reaction zone, replacing the withdrawn portion of spent catalyst by a similar volume of reactivated catalyst, recycling a major portion of said product freed of catalyst for the admixing therewith of the dried reactant mixture, and removing the net alkylate produced per pass from a minor portion of said product.

6. A process for alkylating an alkylatable aromatic hydrocarbon of the class consisting of benzene and toluene with a $C_{11}$ to $C_{21}$ olefin by contact with an inorganic halide alkylation catalyst in the form of a sludge under alkylation conditions, which comprises passing a feed mixture stream containing between 1 and 5 volumes of the aromatic per volume of olefin into a reaction mixture containing the catalyst, simultaneously mixing with said feed stream a larger volume proportion of a recycled stream of alkylation product containing alkylate and unreacted aromatic withdrawn from said reaction zone and substantially freed of the catalyst, injecting said mixed streams into the reaction mixture agitated thereby in a reaction zone below a more quiescent settling zone in which alkylation product collects, withdrawing the alkylation product substantially freed of catalyst sludge from said settling zone, returning a major portion of the withdrawn alkylation product as said recycled stream, treating a minor portion of said withdrawn alkylation product to recover alkylates therefrom.

7. A process for alkylating benzene with $C_{12}$ polypropylene by contact with an aluminum chloride complex sludge catalyst retained in a reaction zone under alkylation conditions, which comprises passing a feed mixture stream containing between 1 and 5 volumes of benzene per volume of the polypropylene into a body of the sludge catalyst contained in a bottom part of the reaction zone, admixing with said feed stream a larger volume proportion of a recycled stream of alkylation product containing alkylate and unreacted benzene withdrawn from a settling zone above said reaction zone, collecting alkylation product from the reaction zone in the settling zone above the catalyst sludge, withdrawing said alkylation product from said settling zone, returning a major portion of the withdrawn alkylation product as said recycled stream, treating a minor portion of said withdrawn product to recover alkylate therefrom, separately withdrawing a portion of the catalyst sludge as it becomes spent from said reaction zone, dissolving aluminum chloride in a portion of the withdrawn spent catalyst sludge until the sludge contains between 25 and 45 weight per cent of combined aluminum chloride and is thus reactivated, and replacing the withdrawn portion of the spent catalyst by a similar volume of the thus reactivated catalyst sludge.

8. A process for alkylating benzene with a $C_{11}$ to $C_{21}$ olefin by contact with an inorganic halide alkylation catalyst in the form of a sludge under alkylation conditions, which comprises passing a feed mixture stream of up to 3 moles benzene per mole of the olefin into a reaction mixture containing the catalyst under alkylation conditions, mixing with said feed stream a larger volume proportion of a recycled stream of alkylation product containing benzene alkylated by the olefin and unreacted benzene withdrawn from said reaction zone for increasing the aromatic to olefin ratio therein to at least 10:1, agitating the reaction mixture in the reaction zone by injecting the mixed streams below a more quiescent settling zone in which alkylation product and unreacted benzene collect, withdrawing alkylation product and unreacted benzene from said settling zone, returning a major portion of the alkylation product with unreacted benzene withdrawn from said settling zone as said recycled stream to the reaction zone, treating a minor portion of said withdrawn alkylation product to recover alkylate therefrom, retaining the catalyst in the reaction zone except for a portion thereof which is withdrawn to be reactivated and returned to the reaction zone and except for a portion which is withdrawn as spent catalyst.

WALTER J. PALTZ.
BRUCE R. TEGGE.

References Cited in the file of this patent

UNITED STATES PATENTS

| Number | Name | Date |
|---|---|---|
| 2,373,062 | Stahly | Apr. 3, 1945 |
| 2,388,007 | Pardee et al. | Oct. 30, 1945 |
| 2,388,758 | Mills, Jr. | Nov. 13, 1945 |
| 2,404,340 | Zimmerman | July 16, 1946 |
| 2,426,611 | Hudson et al. | Sept. 2, 1947 |
| 2,437,356 | Hill | Mar. 9, 1948 |
| 2,448,641 | Whitman | Sept. 7, 1948 |
| 2,477,382 | Lewis | July 26, 1949 |
| 2,498,567 | Morris et al. | Feb. 21, 1950 |